(12) United States Patent
Brugger et al.

(10) Patent No.: US 9,374,345 B2
(45) Date of Patent: *Jun. 21, 2016

(54) TRANSPARENT ENCRYPTION/DECRYPTION GATEWAY FOR CLOUD STORAGE SERVICES

(71) Applicant: International Business Machines Corporation, Armonk, NY (US)

(72) Inventors: Dominik W. Brugger, Kassel (DE); Matthias Seul, Kassel (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/731,505

(22) Filed: Jun. 5, 2015

(65) Prior Publication Data

US 2015/0271151 A1 Sep. 24, 2015

Related U.S. Application Data

(63) Continuation of application No. 14/150,894, filed on Jan. 9, 2014.

(30) Foreign Application Priority Data

Jan. 9, 2013 (GB) .................................. 1300316.5

(51) Int. Cl.
*H04L 29/06* (2006.01)
*G06F 21/60* (2013.01)

(52) U.S. Cl.
CPC ............ *H04L 63/0435* (2013.01); *G06F 21/60* (2013.01); *H04L 63/0227* (2013.01); *H04L 63/0428* (2013.01); *H04L 63/101* (2013.01); *H04L 63/1441* (2013.01)

(58) Field of Classification Search
CPC ............ H04L 63/0435; H04L 63/0227; H04L 63/101
USPC ......................................................... 713/154
See application file for complete search history.

(56) References Cited

U.S. PATENT DOCUMENTS 7,783,046 B1 * 8/2010 Sklyarov ............... H04L 9/0894
380/277
8,051,487 B2 11/2011 Huang et al.
(Continued)

FOREIGN PATENT DOCUMENTS

EP       2366229 A2      9/2011
WO    WO2012/145825 A1  11/2012

OTHER PUBLICATIONS

Search Report under Section 17(5), Dated Jun. 17, 2013, Application No. GB1300316.5, 3 pages.
(Continued)

*Primary Examiner* — Dao Ho
(74) *Attorney, Agent, or Firm* — Stephen R. Tkacs; Stephen J. Walder, Jr.; Gail Zarick

(57) ABSTRACT

A mechanism is provided for secure data storage in a distributed computing system by a client of the distributed computing system. A gateway device intercepts a data file from at least a portion of stream data during transmission. If the destination of the data file is the storage, the gateway device selects a set of analysis algorithms to determine whether the data file comprises sensitive data.

14 Claims, 3 Drawing Sheets

(56) References Cited

U.S. PATENT DOCUMENTS

| | | | |
|---|---|---|---|
| 8,176,563 B2* | 5/2012 | Redlich | G06F 21/6209 713/166 |
| 8,856,869 B1* | 10/2014 | Brinskelle | H04L 63/08 726/12 |
| 2005/0138110 A1* | 6/2005 | Redlich | C07K 14/70575 709/201 |
| 2007/0276958 A1* | 11/2007 | Curtis | H04L 63/0272 709/238 |
| 2010/0097992 A1* | 4/2010 | Velev | H04L 12/66 370/328 |
| 2010/0332818 A1 | 12/2010 | Prahlad et al. | |
| 2010/0333116 A1 | 12/2010 | Prahlad et al. | |
| 2012/0166576 A1* | 6/2012 | Orsini | G06F 11/1471 709/217 |
| 2014/0195798 A1* | 7/2014 | Brugger | H04L 63/0227 713/154 |

OTHER PUBLICATIONS

U.S. Appl. No. 14/150,894.

Sophos. "SafeGuard Encryption for Cloud Storage", Sophos Media Library, http://www.sophos.com/medialibrary/PDFs/factsheets/sophossafeguardencryptionforcloudstoragedsna.pdf ), 2012, 4 pages.

\* cited by examiner

TRANSPARENT ENCRYPTION/DECRYPTION GATEWAY FOR CLOUD STORAGE SERVICES

BACKGROUND

The invention relates to distributed computing systems, and more particularly to a method for secure data storage.

Cloud computing has become a popular way to offer various Information Technology (IT) concepts as services. The Cloud computing adoption continues to grow and companies such as financial companies are willing to trust their data to cloud-based software.

SUMMARY

In one aspect, a computer implemented method is provided for secure data storage in a storage in a distributed computing system by a client of the distributed computing system. The method comprises in a gateway device of the distributed computing system intercepting a data file from at least a portion of stream data during transmission of the stream data in the distributed computing system; evaluating the data file for determining the communication protocol used for the stream data transmission; and evaluating the data file based on the communication protocol for determining the destination and the source of the data file. The method further comprises, if the destination is the storage, selecting a set of analysis algorithms from a plurality of predetermined analysis algorithms; analyzing the data file using each of the analysis algorithms of the set of analysis algorithms for determining if the data file comprises sensitive data; in response to a determination that the data file comprises sensitive data, replacing payload content of the data file with encrypted payload data; and transmitting the data file to the storage.

In another aspect, the invention relates to a computer-readable medium, comprising computer-readable program code embodied therewith which, when executed by a processor, cause the processor to execute a method according to anyone of the previous embodiments.

In another aspect, a gateway device for secure data storage in a storage in a distributed computing system, the gateway device comprising a memory for storing machine executable instructions and a processor for controlling the gateway device, wherein execution of the machine executable instructions causes the processor to intercept a data file from at least a portion of stream data during transmission of the stream data in the distributed computing system; evaluate the data file for determining the communication protocol used for the data transmission; and evaluate the data file based on the communication protocol for determining the destination and the source of the data file. If the destination is the storage the instructions cause the processor to select a set of analysis algorithms from a plurality of predetermined analysis algorithms; analyze the data file using each of the analysis algorithms of the set of analysis algorithms for determining if the data file comprises sensitive data; in response to a determination that the data file comprises sensitive data, replace payload content of the data file with encrypted payload data; and transmit the data file to the storage.

It is understood that one or more of the aforementioned embodiments may be combined as long as the combined embodiments are not mutually exclusive.

BRIEF DESCRIPTION OF THE SEVERAL VIEWS OF THE DRAWINGS

In the following, preferred embodiments of the invention will be described in greater detail by way of example only making reference to the drawings in which.

DETAILED DESCRIPTION

In the following, like numbered elements in the figures either designate similar elements or designate elements that perform an equivalent function. Elements which have been discussed previously will not necessarily be discussed in later figures if the function is equivalent.

Figure 1:
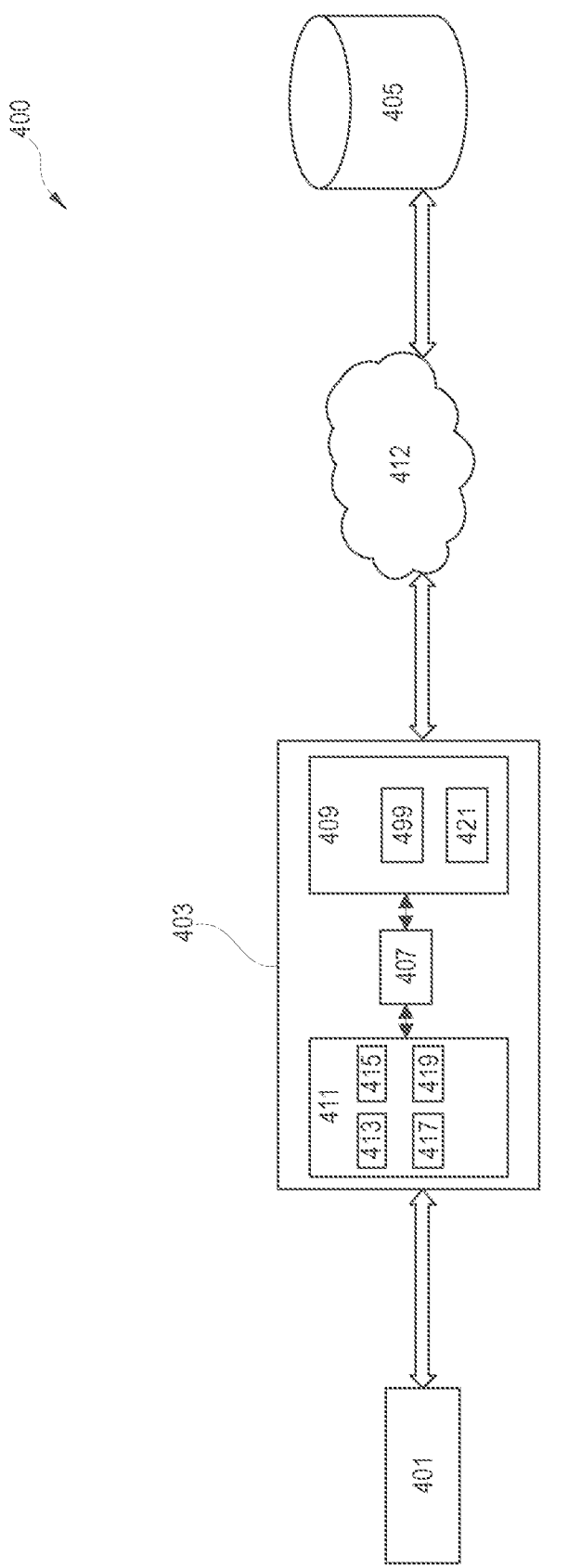
FIG. 1 illustrates system architecture for the execution of a method for secure data storage.

FIG. 1 shows a diagram illustrating a computing system 400 in which the gateway device may operate. The computing system 400 may be a cloud computing system, for example. The computing system 400 includes at least one client 401 connected to the gateway device 403. The client 401 may include computers associated with users or servers that access data and/or generate data to be stored in a storage service 405. The client 401 may be connected to the gateway device 403 directly or via a local area network (LAN). The gateway device 403 may be connected to the storage service 405 via a network 412, which may be a public network, such as the Internet, a private network, such as a wide area network (WAN), or a combination thereof.

The storage service 405 may be a dynamically scalable storage such as remote hard disks and provided as a service over a public network (e.g., the Internet) or a private network (e.g., a wide area network (WAN)). The storage service 405 may be one of storage clouds Amazon's® Simple Storage Service (S3), Nirvanix® Storage Delivery Network (SDN), Windows® Live SkyDrive, Ironmountain's® storage cloud, Rackspace® Cloudfiles, AT&T® Synaptic Storage as a Service, Zetta® Enterprise Cloud Storage On Demand, IBM® Smart Business Storage Cloud, and Mosso® Cloud Files.

The gateway device 403 may be a computing device such as a desktop computer, server, etc. The gateway device 403 comprises a processor 407. The processor 407 is connected to a computer storage 409, and computer memory 411.

The gateway device 403 may be placed inside the client's network (not shown) at the edge of said network. Alternatively, the gateway device 403 may be part of a router or Virtual Private Network (VPN) server, a standalone appliance or a process running on a (mobile) client device. The data traffic may be routed in a way that the gateway is able to intercept, inspect and modify all incoming and outgoing traffic.

In another alternative, the gateway device 403 may be part of a cloud stack, e.g. "Desktop in the Cloud." In this case the present method may be placed inside the cloud stack environment, protecting data entering and leaving the desktop instance.

The computer storage 409 is shown as containing a plurality of encryption keys 499. The computer storage 409 is further shown as containing a policy storage unit 421.

The computer memory 411 is shown as containing a receiving module 413. The receiving module 413 contains computer-executable codes which enable the processor 407 to automatically intercept a data file during data transmission between the client 401 and the storage service 405.

The computer memory 411 is further shown as containing an analysis module 415 and an encryption module 417. The computer memory 411 is further shown as containing a transmission module 419.

The gateway device 403 is shown as a single device but it may also be implemented as a distributed system. This means both distributing the modules 413-419 across several devices of the distributed computing system as well as having the option of deploying multiple instances of the gateway for load-balancing, high availability, etc.

For example, the encryption module 417 may be part of a separate system and accessed by the gateway device 403 over a secure interface.

For example, the policy storage unit 421 may also be part of a separate system and accessed by the gateway device 403 over a secure interface.

The operation of the system 400 will be described in more detail with reference to FIG. 2.

A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Figure 2:
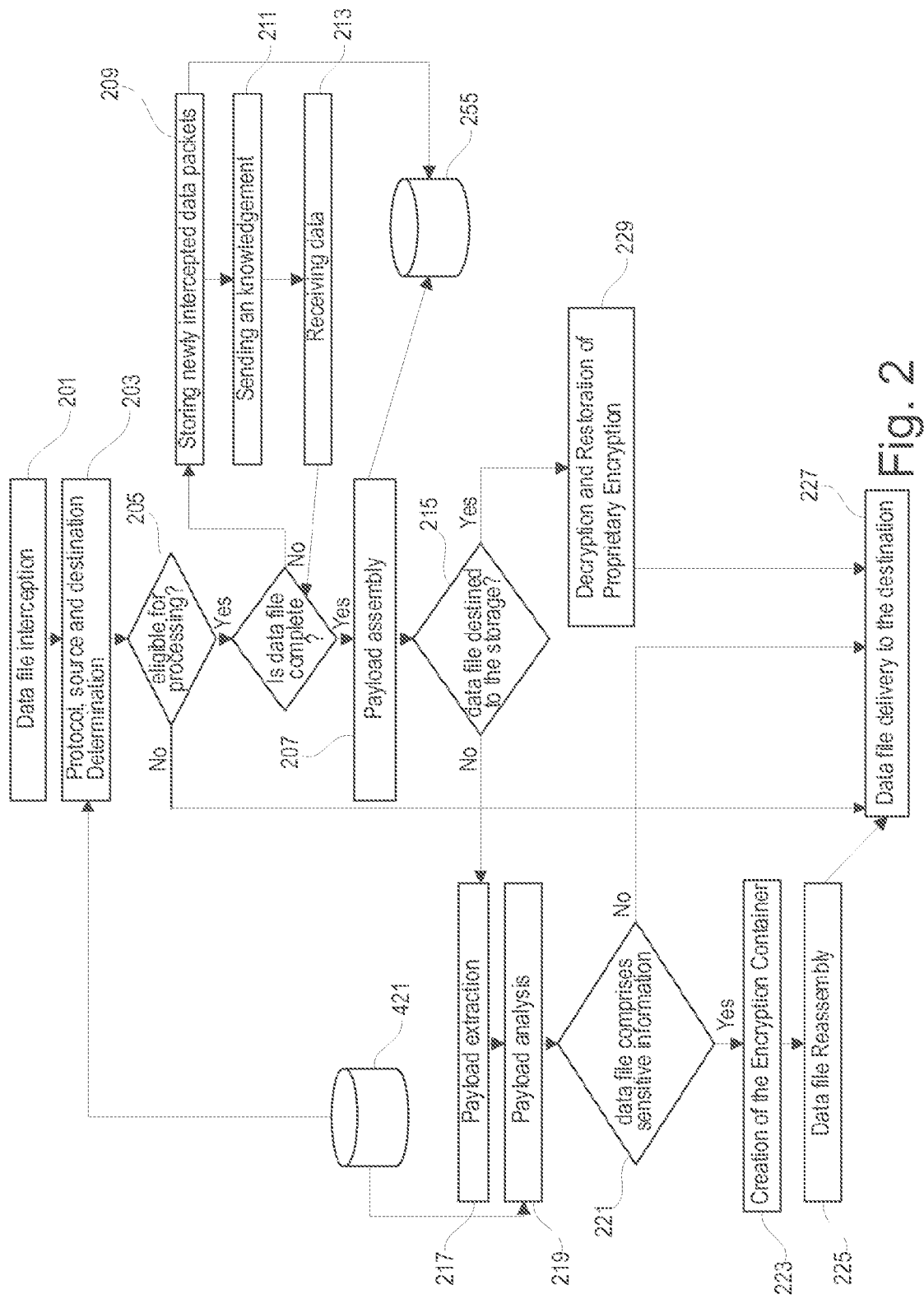
FIG. 2 is a flowchart of a method for secure data storage.

FIG. 2 is a flowchart of a method, in a gateway device, for secure data storage in a storage service e.g. 405 in a distributed computing system such as a cloud computing system.

Whenever the receiving module 413 of the gateway device 403 receives an outgoing data file in step 201, it determines if said data file has a valid target for encryption purposes. For this, the gateway device uses a multi-step procedure. The gateway device may treat all incoming traffic as equal and determine based on the target and content of said traffic if an encryption action is necessary. The data file may be transmitted as a sequence of one or more data packets forming at least a portion of a data stream. The one or more data packets of the data file are sequentially intercepted by the gateway device in step 201.

In step 203, the protocol used for transmission of the data file and the source and the destination of the data file may be determined. For this, the gateway may use at least part of the data file, e.g. one data packet. The gateway device may access a known protocol patterns stored in the policy storage unit 421 allowing to determine the protocol used by looking at the content of the data file, identifiers and the like. The identifiers may comprise explicit service identifiers and signatures, data file destination, format and structuring of the data file, and/or Uniform Resource Locator (URL) associated with the data file (e.g. in case of Hypertext Transfer Protocol (HTTP)).

Once a protocol has been determined, storage products that are known to use said protocol—for example HTTP, may be determined. The policy storage unit 421 is used to make this determination.

For example, in case of HTTP protocol the Web Application Control ("WAC") may be used to make an exact determination of the product used, the data file request being made and the data transfer capabilities of said request.

However, since HTTP can carry different products and offerings apart from storage the exact transaction type (e.g source and destination of the data file) needs to be determined.

For example, regular host or URL-based approaches may not work with HTTP-based services as vendors may offer web-based user interfaces to view a listing of the storage alongside the actual storage and retrieval functionality. The WAC technology may allow the gateway to make the differentiation between non-storage and storage traffic. This may be advantageous as it may avoid the case where this differentiation is not made for web-based services and may break or become unresponsive. The gateway may thus be considered to be aware of individual web applications' cartography. If the data file intercepted is not a known data storage attempt it may be delivered to its intended destination unchanged. If the data file however is targeted at cloud storage and has the possibility to deliver data to the outside the gateway may initiate further processing.

In step 205, the gateway device may check if the intercepted data packets of the data file are "eligible for processing" and may evaluate if these packets may be further handled by the gateway. For example, if the data packets are determined to be erroneous, the gateway may not handle them and may just send them to their destination.

The analysis of the data file may require the full payload content (e.g. when the data file is a compressed data file) of all one or more data packets to be present locally in the gateway device, e.g. stored in an internal storage pool 255, such that the payload content of the one or more data packets may be assembled in step 207 if the data file is complete. In this case a newly intercepted data packet may be merged with the existing ones stored in the storage pool 255. The gateway device may determine if the data file is complete dependent on the protocol used. For example, the identifiers examined to make this determination may be explicit end-of-stream identifiers that can be either part of the data file as a command argument or an individual command; if known size of data received versus expected total size; small payload packet after a stream of identically sized, larger packets; request to close the client connection to the server (e.g. "Connection: Close" header); termination of the client connection after transfer; initiation of a new request stream from the same user/client.

However, the data file may not be complete, as the gateway device either knows the source, e.g. the client, to stop sending data as he or she may be waiting for the remote side to answer or acknowledge the transfer of the already sent request data or the client stops sending while the data is considered incomplete, for example, because the client encountered an error, crashed or the connection was interrupted. In this case, the gateway device may store in step 209 newly intercepted data packets in the storage pool 255 and may re-establish the data stream either by sending a simple packet acknowledgement ("ACK") or by mimicking the storage service ("OK") responses in step 211. In the latter case, the gateway device may function similar to a transparent proxy, using the same protocol as the client but acting as a surrogate/Man-in-the-Middle server. In step 213, the gateway may receive data from the source in response to the acknowledgement. The portion of data packets may be held back with the communication channel to the external service being silent until a determination of the data sensitivity can be made. For example the data file may be transmitted to the remote side destination using several subsequent requests but the sensitivity of said data file can only be determined after two or more parts are available in the gateway.

To make this pooling possible the gateway may intercept all data belonging to said data file without immediately forwarding them to the destination.

This process is transparent for the client as it may receive "OK" or "CONTINUE" responses by the gateway as if received from the storage service directly.

If it is determined in step 215 that the destination of the data file is the storage service 405, the gateway device may perform steps 217-227. In case the destination is the client and the source is the storage service the gateway device 403 may perform the steps of 229 and 227.

In step 217 the gateway device may extract the payload content of the data file depending on the protocol and/or client's application used. For example, the gateway may use at least one of these techniques: decoding (e.g. base64, identity, deflate, etc.), decompression (e.g. gzip, tar, zip, etc.), decryption of foreign encryption (necessary keys can be provided or extracted from prior requests if the gateway is deployed as a man-in-the-middle and able to eavesdrop on encryption handshakes), or reassembly for chunked/split data.

If the extracted payload is of specific binary data containers, such as PDF, Microsoft Word, Microsoft Excel, ZIP, RAR, UPX, etc., the gateway may use industry-standard components for content extraction of said containers. The extraction may occur over several levels of recursion collecting all extracted data along the way. This may be advantageous as the gateway has to balance risk vs. speed. It has to assume that user may intentionally create large amounts of recursion to hamper proper extraction. Therefore, in the case that the gateway has to recurse at too high a depth (>100 layers of recursion), it may stop the extraction attempt at this point. If this condition occurs the content will be automatically flagged as "sensitive" as the gateway does not have a complete picture of the content.

The payload contents of the data file may be grouped by content type (e.g. text, binary, images, video etc.). The gateway device may then in step 219 analyze each content type with a set of analysis algorithms that may be selected from the following analysis algorithms:

Picture Content analysis: For picture content such as images and videos the gateway device may apply known analysis techniques such as optical character recognition (OCR), image similarity, pattern analysis to either extract text information for later processing or match the found patterns to provided known "sensitive" patterns stored in the policy storage unit 421. Said known patterns can be customer provided, e.g. by letting the gateway device generate patterns from confidential slides, graphs, logos, designs, etc., or vendor provided. Such technology is mostly integrated Anti-Spam products able to identify image-based Spam. If matches are found for image patterns, the data file may be considered as containing sensitive information.

Text Patterns analysis: the text content extracted from both the payload may then be analyzed for indicators of data sensitivity. For example, binary content may be treated as text for further processing. The first analysis method is scanning for predefined text patterns, keywords or text structures (combination or grouping of certain words). The patterns can either be vendor-provided or created from customer-provided lists and may be stored as sensitive data pattern definition in the policy storage unit 421. If matches are found using the patterns the data file may be considered as containing sensitive information.

Text Structure analysis: a text classification of the extracted payload of the data file may be done. This includes analyzing the similarity of the text content and structure to known sensitive information. This information can be vendor provided or "trained" by letting the gateway device do the same analysis on known sensitive samples of information and store the results for reference.

Reverse Spam Analysis: This may be an approach to content classification methods such as Bayesian Classifiers or other statistical learning methods which are used in the present method to separate "sensitive" from "common" data (or non-sensitive data). To do this the gateway device may require a database, e.g. policy storage unit 421, of known text patterns with a weighting, which determines how often said patterns are encountered for a given type of content. The gateway device may use these weighted patterns to determine how many indicators for sensitive content are present inside and how important they are. The difference between this method and regular text matching is that it is not a black-and-white decision but instead covers many shades of gray. Using this, the gateway may for example classify a payload as sensitive even if no clear indicators (such as "CONFIDENTIAL!") are present but enough lateral indicators commonly present for sensitive information are. This may prevent the obfuscation of documents by simply removing all occurrences of "CONFIDENTIAL!" Learning methods use the so called training set of data that is consulted as reference data for deciding whether or not analyzed data shall be classified sensitive or not. Therefore the gateway device may include a database, e.g. policy storage unit 421, of such reference data that powers the Reverse Spam Analysis. Said database content may be vendor-provided or created using customer specific data, e.g. by letting the gateway device scanning repositories of both known "sensitive" and "common" data. The latter procedure may be done automated and in certain intervals to tailor the database to the unique customer environment. One example may be that documents that originate from a specific user group (e.g. finance) always quality as sensitive by definition and are automatically added as reference data by the gateway device as soon as said documents are processed by the gateway.

Source Reputation analysis: the gateway device may determine the source of the data file, which may include: sending host (IP, subnet), type of client, logged in user and group association (e.g. "Finance"), passive authentication (means authentication information sent out to other services from this machine), or historical information (what type of data does this source usually send).

The determined information on the source of the data file may indicate that the source may most likely send sensitive data or not.

The selection of the set of analysis algorithms may be based on the client to set indicators that show the payload content of the data file to be either "sensitive" or "common" data. For example, the gateway device may comprise a table having one or more entries, each entry comprises a client ID, a data file type identifier and a required set of analysis algorithms to analyze such data file type. Upon evaluating the content of the data file, the gateway device may read the table and determine the set of analysis algorithms that are suitable for the data file being evaluated. In another example, the gateway device may randomly select the set of analysis algorithms from the plurality of the analysis algorithms described above.

Each analysis algorithm of the set of the analysis algorithms is associated with a predefined weight which may be for example stored in each entry of the above table in association with the set of analysis algorithms. This weighting may allow customer-specific focus on certain analysis results dependent on the customer's environment, culture and line of business.

After analyzing the data file using each of the selected set of analysis algorithms, the gateway 403 may determine in step 221 if the intercepted content is sensitive or can be considered "common." It does this by combining all analysis results and the predefined weights and checking if enough indicators are present to reach a customer-configurable threshold (or sensitivity threshold). For example, the gateway device associates to each result of the selected set of analysis algorithms a number indicating that the data file comprises sensitive or not sensitive data (e.g a number 0 if the data file does not comprise sensitive data and a number 1 if the data file comprises sensitive data), and may calculate a weighted sum of the numbers of results indicating that the data file contains sensitive data and then compare the weighted sum with the customer-configurable threshold. If the threshold is not reached the data file is released to its originally intended destination without any change. If the weighted sum is higher than the threshold, the gateway device may proceed with the content encryption. The encryption decision is made automatically and based on a set of algorithms, which reduces the rate of (un-)intentional leakage of sensitive content to a minimum compared to manual encryption concepts.

Before encryption, the gateway device may separate payload content of the data file from protocol-specific data. Since the gateway device has already (at the initial data file evaluation for protocol determination) recursed through all levels of the payload, the gateway device may decide where to start encrypting. Since the present method is intruding on the transaction being made between the client and the storage service, the gateway may require neither the client nor the storage service to participate in the transaction manipulation and may check that both sides of the transaction do not react negatively because of its action.

In case the intercepted content is determined to be non-sensitive, the gateway device may deliver the data file to its destination.

In case the intercepted content is determined to be sensitive, the gateway device may create in step 223 a data container and encrypt the payload content of the data file using at least one encryption key, and then store the encrypted payload content in the data container. The at least one encryption key may also be stored in the gateway. To ensure that the encrypted payload may fit into the available payload space of the data file, the gateway device may augment and/or reduce the size of the payload content of the data container such that the size of the payload content of the data container is the same as the size of the payload content of the data file. For example, the gateway may compress the payload content received using reversible, lossless compression. This may reduce the payload enough to add the encryption layer without making the payload as a whole larger or smaller than the payload content of the data file (the compression may also be applied after encrypting the payload content of the data file). In case the encrypted payload content size is smaller than the payload content size of the data file, the gateway device may add padding to the payload ("empty data") to match the size of the payload content of the data file.

The gateway device may use the policy storage unit 421 of known protocol patterns to determine the best way to approach the payload content of the data file and may choose the layer of information that is as near to the protocol layer as possible. It may then take all data above said layer in its original form and place it inside the encryption container.

The encryption may be based for example on a customer-specified encryption solution, method and strength using an external service, hardware or on-system library or process. In another example, the gateway device may request encryption keys or identifiers from previously used encryption solution if this is information necessary to decrypt the content later. It may for example use one of the plurality of encryption keys 499 stored in the gateway device.

For example, the created container may be extended with a unique identifier which may allow the gateway to both identify the container as its own as well as retrieve additional information (e.g. type of encryption used) if that is necessary to decrypt the container later. In another example, the created container may be identified using stored encryption keys, e.g. 499.

To finally store the encrypted payload content on the storage service, while still keeping such process transparent to the user, the gateway device may modify in step 225 the data file content by replacing the payload content of the data file with the payload content of the data container.

In another example, the storage service side verification mechanism that validates data integrity of the payload and protocol conformity of the data file may require the gateway to rebuild one or more valid requests containing the data file that will be accepted by the remote side, i.e. storage service.

The protocol may require that the size of the payload is verified by the remote storage side. In this case, the data file may contain the file size of the payload or of its data packets.

The gateway device may then examine the edited requests and adjust any other information that has to be updated to reflect the replaced content. This can include change of content, size and number of requests to be made (if the content is drastically smaller or larger after encryption/compression) as well as checksums, header fields (e.g. "Content-Size") that may be included in the request to allow the remote side to verify the integrity of the data file even after it has been replaced by the gateway (e.g. calculated Cyclic Redundancy Check values (CRC), MD5, SHA1 or other hash values).

In step 227, the gateway device may transmit the data file with encrypted content to the destination storage service. This delivery is handled automatically and communicated to the client since the client has already received "OK" responses for all transaction parts.

The gateway device may split up the transaction to mirror the sequence and setup of the parts received initially, with each part having the original position in the stream. This ensures the remote side will accept the replayed/reassembled transaction if it is depending on the order of the requests received.

If the policy requires specific notifications the gateway device may also for example notify compliance officers if a data file that contains certain content is uploaded. It may also prevent the upload of the data file altogether and relay the encrypted content to a different storage site instead of uploading to the intended target for analysis.

In step 229, the gateway device may determine if the data file is encrypted in accordance with an encryption key of a plurality of stored encryption keys. The gateway device may require the full content to be available for it to be able to decrypt it properly. If the storage service does not send the whole content or interrupts the transfer to wait for client responses the gateway device may mimic said responses. The gateway may handle this in isolation from the client originally requesting the content since it cannot relay any of the information chunks prior to decryption. If the gateway device opted to encrypt the payload content of the data file on a per-chunk basis it may skip collecting the whole content and decrypt chunks as they come in.

In response to a determination that the data file is encrypted with a stored encryption key the gateway may decrypt the data file using the stored encryption key. The gateway device may retrieve additional information from the container as well as the storage 499, 421 to determine how to handle the response. In case the gateway device knows how to decrypt the content it may check if the user/service requesting the content is eligible. For that the gateway may use information contained in the intercepted response or the request that triggered said response. For example, the gateway may use connected external services such as Lightweight Directory Access Protocol (LDAP) directories, authentication services (Tokens, time slots, etc.) to determine if the user/service may be allowed access. If the user/service is not allowed access the response can be completely dropped, delivered in encrypted form, replaced by an error message or similar. The encryption may for this purpose create pre-encrypted error containers that are sent instead of the original content but still show up as valid on the client side (e.g. client requests "secret.doc", and the gateway replaces contents of "secret.doc" with "ACCESS DENIED"). Compliance/Security officers of the distributed computing system may be notified if a security incident is detected.

If the user/service may access the content, the gateway may decrypt the content with the available information requesting the necessary keys and decryption services as necessary from external systems or on-system libraries/processes. If the content of the data file was originally sent by the client encrypted with a proprietary encryption of which the gateway had the proper key for decryption it may use this information to re-encrypt the content. This may help to handle the data file as it originally replaced the proprietary encryption with its own but must also ensure that content is delivered in a format understood by the client.

After the content has been decrypted the gateway device may replace the received payload with the decrypted content. At best the received payload may be reported the same as the decrypted variant due to the encrypt/compress/pad steps taken during encryption making the response modification considerably easier.

For example, the gateway may choose to completely rebuild the response discarding the received one if reassembly is easier than replacement. In step 227, the gateway may deliver the response chunks in the same sequence as received by the storage service to ensure compatibility with the requesting client.

Figure 3:
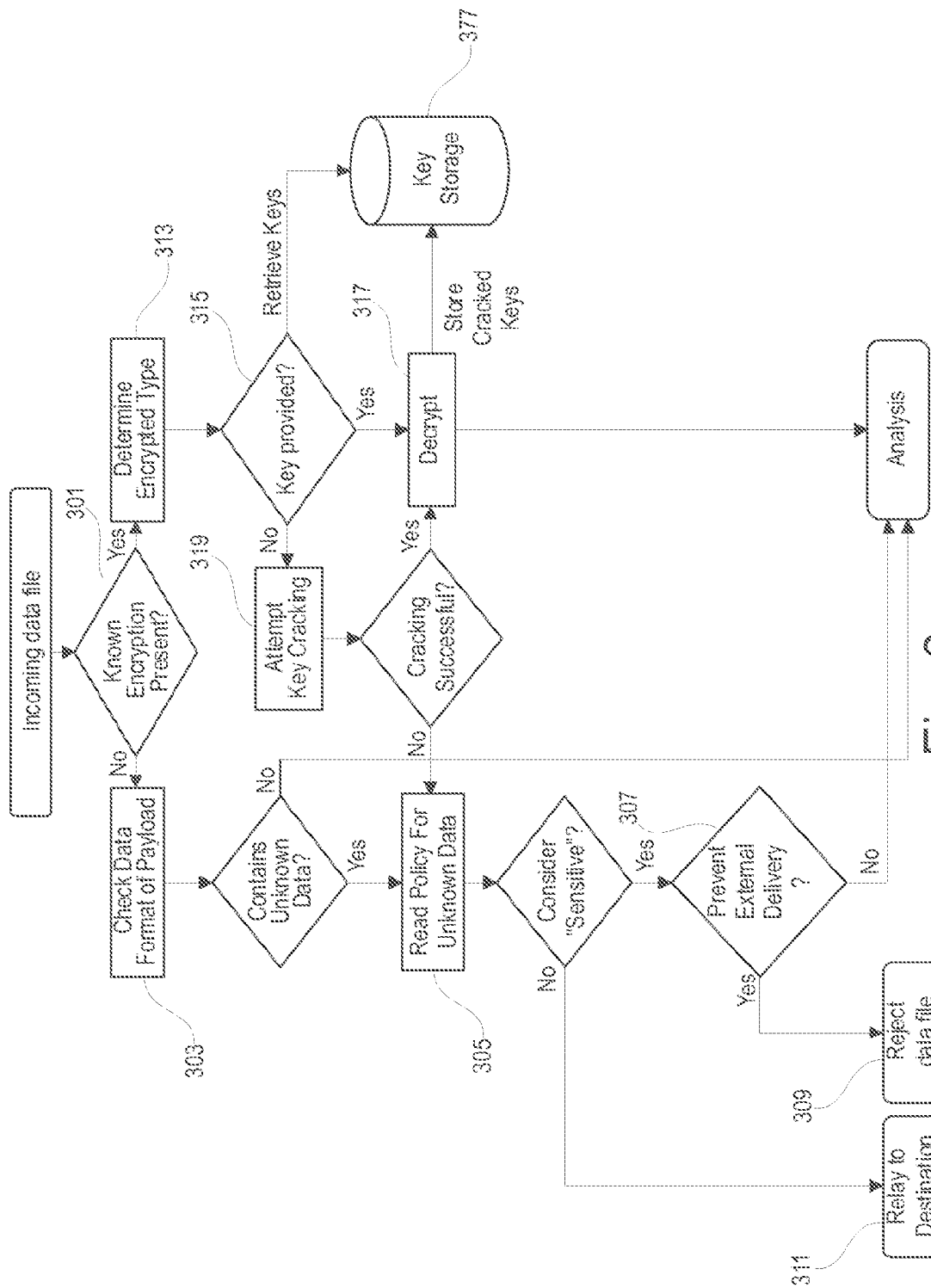
FIG. 3 is a flowchart of a method for handling an existing encryption.

FIG. 3 is a flowchart of a method for handling an existing encryption. In fact, the data file intercepted by the gateway may be already encrypted before reaching the gateway (i.e. called Proprietary Encryption above). Since the present method is based around the concept of protecting uploaded content it will assume any request containing no such usable data (and only scrambled or useless payload) to be a form of unknown encryption. In this case, the gateway device may assume that existing encryption is not stable (might be dissolved as soon as the content reaches the targeted service) and possibly hostile (intentional obfuscation by malicious users).

If the encryption is considered unknown in step 301 or no decryption key can be determined, the gateway may check in step 303 if the payload content of the data file contains unknown data. In step 305, the gateway may read pattern definitions of unknown data stored in the policy storage unit 421 and may consider the data to be transferred as "sensitive" since someone else already applied a reliable encryption to it. In this case, the gateway may decide in step 307 if said payload content that is not identified/classified is to be delivered or not for further processing (e.g. for applying the analysis as described in FIG. 2). This may be done for example by prompting information on the payload content to an administrator of the distributed computing system, and receiving response data via an interface from the administrator. Based on the received response data the gateway may decide to deliver or not the data file. The data file may then be rejected in step 309 if the gateway device decides to not deliver it or further processing.

In case the payload content does not contain sensitive data, the gateway may deliver the data file to its destination in step 311.

If the encryption is known the gateway may determine the encryption type in step 313. In case a working decryption key has been provided to the gateway in step 315 e.g. retrieved from the key storage 377 (e.g. by providing digital key chain) the gateway may revert the encryption and extract the content of the data file in step 317.

If the encryption is known and no key has been provided the gateway may attack in step 319 the encryption by applying known key-finding techniques such as rainbow tables to forcibly open the encrypted container. The gateway may allocate a predetermined amount of time for an attempt at cracking the encryption. If the allocated time has passed and/or the cracking is unsuccessful the gateway may consider the content as described in steps 305-311. The gateway may make use of dedicated computing or cracking hardware such as GPU clusters to decrease the time needed for decryption.

If the cracking is successful the gateway may decrypt the content of the data file in step 317 and may store the cracked keys in the key storage 377. After being decrypted, the data file may be processed as described with reference to FIG. 2.

If an existing encryption has been unwrapped the gateway may record this fact and eventually used/discovered keys in case the content is retrieved from the storage service later as the encryption has to be re-applied.

The data file may be transmitted as a sequence of one or more data packets forming the at least portion of the data stream.

The sensitive data may be, for example, personal data, such as address, phone number, and financial information, such as a bank account number or a credit card number.

These features may be advantageous as they may provide a transparent gateway service for storage offerings which transparently encrypts data to be stored by the client on an external storage and may also handle decryption of said encrypted data as soon as it is downloaded by the client. Also, since all traffic is examined impartially, sensitive content is protected even if clients try to send it unencrypted—be it by accident or due to malicious intent. These features may also ensure that the encryption is applied based on a calculated "worth" or sensitivity of transmitted data and not when a client makes the decision to apply encryption.

This may allow the client to freely choose a storage vendor, independent on whether he provides secure storage or not. This is due to the fact that the data received for storage in the distributed computing system is automatically encrypted using the gateway itself. Thus, the client may not need to install any available cryptographic module, as the encryption is centrally performed.

Another advantage may be that the method may provide encryption security for both data in motion (while transferring to and from a Cloud provider) and at rest (stored in the Cloud provider's infrastructure).

Another advantage may be that the method may apply the encryption without the client and the storage provider supporting any encryption at all. It may even be added to encryption by the storage provider. This may also avoid data leaking in the distributed computing system for example when a malicious or inattentive client employs a different storage provider because the encryption chosen by the client may fall short.

Another advantage may be that a number of different encryption setups may be used and company IT Administrators and compliance officers may exert full control over how data is encrypted, who will have access to it and where the encryption keys are stored.

According to one embodiment, the distributed computing system is a cloud computing system. In this case, the storage may be provided as a service by one or more client providers of the cloud computing system. This may be advantageous as the present method may be implemented in different distributed computing systems such as the cloud computing system, grid computing system and cluster computing systems.

According to one embodiment, the evaluating the data file for determining the communication protocol comprises: determining that the data file is encrypted; determining the encryption key used to encrypt the data file; decrypting the data file using the determined encryption key; wherein the transmission of the data file to the client is performed after encrypting the data file using the determined encryption key.

According to one embodiment, in case the encryption key used to encrypt the data file is unknown the determining the encryption key comprises recovering during a predefined time period said encryption key using a Rainbow table.

According to one embodiment, the intercepting comprises sequentially intercepting data packets of the data file; determining if the data file is complete; in response to a determination that the data file is not complete, sending an acknowledgment message to the client for triggering further data transmission from the client.

According to one embodiment, the gateway device comprises a data structure of one or more entries comprising client category identifiers and corresponding encryption data, wherein the encrypting comprises determining a client category identifier of the client using client's data stored in the distributed computing system and/or the data payload; reading the data structure using the client category identifier; determining the at least one encryption key based on the encryption data corresponding with the determined client category identifier.

For example, the data structure may be a table having one or more entries, each entry representing a client category. Each entry comprises a client category identifier and corresponding encryption data. The table may be stored in a memory of the gateway device. This may increase the speed of the process of encryption and/or decryption, and thus, may reduce potential impact on the end-end delay of the data file.

The client category identifier may be for example an entry index identifying the entry representing the client category. The client category may be for example, a medical service and/or financial service.

This embodiment may be advantageous, as the encryption/decryption process is completely transparent to the client as there are no inputs required from the client during the process of storage/usage of data.

According to one embodiment, the encryption data is indicative of the encryption strength in one or more levels of encryption.

For example, in case of a medical service that may handle patient's medical records, the encryption data may be indicative of a high level encryption. The encryption level may be defined in accordance with the strength of encryption algorithm using for example variable length of encryption keys.

According to one embodiment, the encryption data is indicative of the encryption key type. For example, it may indicate that the encryption key may be a symmetric and/or asymmetric key.

According to one embodiment, the determining the at least one encryption key comprises generating the at least one encryption key, and/or selecting the at least one encryption key from the plurality of stored encryption keys.

According to one embodiment, the encrypting comprises encrypting the payload content based on a service level agreement, SLA, wherein the SLA comprises at least one service level objective, SLO.

This may be advantageous as it may increase the quality of the service provided by the computing system. The computing system may provide data storage with a predefined quality such as data security level and data transmission time between the storage and the client.

According to one embodiment, the at least one SLO comprises a condition specification identifying a condition that is selected from the group consisting of: encrypting the payload content in a predefined encryption level; or encrypting the payload content using a predefined encryption technique.

The encryption technique may comprise for example symmetric algorithms and/or asymmetric algorithms. Symmetric algorithm uses a single key for both encryption and decryption. Asymmetric, or public/private encryption, uses a pair of keys. Data encrypted using one key can only be decrypted using the other key in the public/private key pair.

This may be advantageous, in that the client may define the security level that is suitable for his or her activities.

According to one embodiment, the at least one SLO further comprises a condition specification identifying a condition of a time-dependent encryption. For example, during a time period t1 the client may require using encryption method 1 and during a time period t2 the client may require using another encryption method 2.

For example, the financial service may require an encryption level dependent on the year period. At the end of the year, the financial service may expect to use highly confidential data for example concerning annual activities or results and thus may require a high encryption level when data are stored in this period of the end of the year.

According to one embodiment, the cloud computing system provides one or more services, wherein a service is one of infrastructure as a service (IaaS), software as a service (SaaS), platform as a service (PaaS), and database as a service (DaaS), the encrypting comprises: determining a service provided to the client using client's data stored in the cloud computing system and encrypting the data payload based on the determined service.

For example, if SaaS is provided to the client, the encrypting may be performed using the method of the data structure described above. In another example, if the client is paying for IaaS, the encrypting may be performed based on SLO conditions as described above. This may be advantageous, as the present method may be integrated in existing cloud computing systems without requiring changes in the service definitions or delivery. For example, a client registered for IaaS may have more (deeper) benefits of the system than the client of SaaS, and thus may be allowed to define its own encryption conditions.

According to one embodiment, the plurality of analysis algorithms comprises an analysis algorithm for identifying sensitive data in the payload content of the data file by comparing the payload content of the data file with sensitive data pattern definition stored in the distributed computing system.

For example, the payload content may contain keywords such as "confidential" that are defined as sensitive data i.e. comprised in the sensitive data pattern definition.

In another example, the media type of the payload content may be also used to define sensitive data. For example, a document media type may be considered as containing sensitive data in contrast to an image media type.

The sensitive data pattern definition may be received from the client. The sensitive data pattern definition may be stored in association with the client ID. According to one embodiment, the comparing the payload content comprises: determining the client ID associated with the client and comparing the payload content with sensitive data pattern definition associated with the determined client ID.

This may be advantageous as it may provide a simple and fast method for checking the sensitivity of the data to be stored.

According to one embodiment, the plurality of analysis algorithms further comprises a Reverse Spam Analysis.

The Reverse Spam Analysis may be performed by using information on the payload as input to a statistical learning method, and therefrom classifying the data payload as being sensitive data payload or not.

According to one embodiment, the analysis of the data file using the Reverse Spam Analysis comprises providing reference data for sensitive and non-sensitive data respectively; processing the reference data by a statistical learning technique for generating weights to denote sensitive and non-sensitive data; using the generated weights for determining if the payload content of the data file comprises sensitive data.

This may be advantageous, as it may provide an accurate method for classifying the payload content so as to encrypt it or not.

According to one embodiment, the distributed computing system comprises an access control list comprising client IDs of clients having access to the data file, wherein the transmitting comprises identifying a client ID of the client, wherein the authorization condition comprises: the access control list comprises the client ID.

This may be advantageous, as the data are transmitted to authorized clients only, and thus, may avoid malicious actions that attempt to compromise and/or violate confidentiality, integrity and availability of the data stored in the distributed, computing system.

According to one embodiment, the authorization condition comprises: data transmission occurs during predefined time periods. For example, in case the data stored in the computing system is requested or retrieved by a user during a non-working day, the transmission of the data to the user may not be performed.

According the one embodiment, the method comprises: determining the communication protocol using the header of at least one data packet of the data file.

According to one embodiment, wherein analyzing the data file comprises analyzing the payload content of at least one data packet of the data file.

According to one embodiment, one or more protocol data of respective one or more communication protocols are stored in the distributed computing system, wherein the one or more protocol data are indicative of data payload structure of data file being transmitted in accordance with respective one or more communication protocols. The method further comprises: determining the communication protocol by: using one or more protocol data for determining that the payload content is structured in accordance with the communication protocol.

The invention claimed is:

1. A computer implemented method for secure data storage in a storage in a distributed computing system by a client of the distributed computing system, the method comprising in a gateway device of the distributed computing system:
   intercepting a data file from at least a portion of stream data during transmission of the stream data in the distributed computing system;
   evaluating the data file for determining a communication protocol used for the stream data transmission;
   evaluating the data file based on the communication protocol for determining a destination and a source of the data file;
   responsive to determining the destination is the storage and the source is the client:
      selecting a set of analysis algorithms from a plurality of predetermined analysis algorithms;
      analyzing the data file using each of the analysis algorithms of the set of analysis algorithms for determining whether the data file comprises sensitive data;
      in response to a determination that the data file comprises sensitive data, replacing payload content of the data file with encrypted payload data; and
      transmitting the data file to the storage,
   wherein replacing payload content of the data file with encrypted payload data comprises:
      creating a data container;
      encrypting the payload content of the data file using at least one encryption key;
      storing the at least one encryption key;
      storing the encrypted payload content in the data container;
      augmenting or reducing a size of the payload content of the data container such that the size of the payload content of the data container equals a size of the payload content of the data file; and
      replacing the payload content of the data file with the payload content of the data container.

2. The method according to claim 1, wherein the distributed computing system is a cloud computing system.

3. The method according to claim 1, wherein evaluating the data file for determining the communication protocol comprises:
   determining that the data file is encrypted; and
   determining an encryption key used to encrypt the data file, wherein the method further comprises:
   responsive to determining the destination is the client and the source is the storage:
      decrypting the data file using the determined encryption key; and
      transmitting the data file to the client responsive to decrypting the data file.

4. The method according to claim 3, wherein in case the encryption key used to encrypt the data file is unknown the determining the encryption key comprises recovering during a predefined time period said encryption key using a Rainbow table.

5. The method according to claim 1, wherein the intercepting comprises:
   sequentially intercepting data packets of the data file;
   determining if the data file is complete;
   in response to a determination that the data file is not complete, sending an acknowledgment message to the client for triggering further data transmission from the client.

6. The method according to claim 1, wherein the gateway device comprises a data structure of one or more entries comprising client category identifiers and corresponding encryption data, wherein replacing payload content of the data file with encrypted payload data comprises:
   determining a client category identifier of the client;
   reading the data structure using the client category identifier; and
   determining the at least one encryption key based on the encryption data corresponding to the determined client category identifier.

7. The method according to claim 6, wherein the encryption data is indicative of an encryption strength in one or more levels of encryption.

8. The method according to claim 6, wherein determining the at least one encryption key comprises:
   generating the at least one encryption key; or
   selecting the at least one encryption key from plurality of stored encryption keys.

9. The method according claim 1, wherein the plurality of analysis algorithms comprises an analysis algorithm for identifying sensitive data in the payload content of the data file by comparing the payload content of the data file with sensitive data pattern definitions stored in the distributed computing system.

10. The method according to claim 1, wherein the plurality of analysis algorithms further comprises a Reverse Spam Analysis algorithm.

11. The method according to claim 10, wherein analysis of the data file using the Reverse Spam Analysis algorithm comprises:
providing reference data for sensitive and non-sensitive data respectively;
processing the reference data by a statistical learning technique for generating weights to denote sensitive and non-sensitive data;
using the generated weights for determining whether the payload content of the data file comprises sensitive data.

12. The method according to claim 1, further comprising:
responsive to determining the destination is the client and the source is the storage:
determining whether the data file is encrypted in accordance with an encryption key of a plurality of stored encryption keys;
responsive to determining the data file is encrypted with a stored encryption key, decrypting the data file using the stored encryption key; and
transmitting the data file to the client in response to determining that the client satisfies a predefined authorization condition.

13. The method according to claim 12, wherein the distributed computing system comprises an access control list associated with the data file, the access control list comprising client identifiers of clients having access to the data file, wherein transmitting the data file to the client comprises:
identifying a client identifier of the client, wherein the predefined authorization condition is satisfied if the access control list comprises the client identifier.

14. The method according to claim 1, wherein analyzing the data file using each of the analysis algorithms for determining whether the data file comprises sensitive data comprises:
determining a respective set of results;
associating each result of the set of results with a number indicating whether the data file comprises sensitive or not sensitive data;
calculating a weighted sum of the numbers indicating whether the data file comprises sensitive data using the predefined weights;
comparing the weighted sum with a predetermined sensitivity threshold value.

\* \* \* \* \*